US010699087B1

United States Patent
Ozserin et al.

(10) Patent No.: US 10,699,087 B1
(45) Date of Patent: Jun. 30, 2020

(54) ALTERNATIVE METHOD TO INTERACT WITH A USER INTERFACE USING STANDARD BARCODE SCANNERS PAIRED UP WITH AN AUGMENTED REALITY HEADS UP DISPLAY

(71) Applicant: ZEBRA TECHNOLOGIES CORPORATION, Lincolnshire, IL (US)

(72) Inventors: Ozgur Ozserin, London (GB); James Roger Morley-Smith, Buckinghamshire (GB)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/507,900

(22) Filed: Jul. 10, 2019

(51) Int. Cl.
*G06K 7/10* (2006.01)
*G06T 7/20* (2017.01)
*G06T 7/70* (2017.01)
*G06F 3/033* (2013.01)
*G06K 7/14* (2006.01)
*G06F 3/0482* (2013.01)
*H04W 4/80* (2018.01)

(52) U.S. Cl.
CPC ......... *G06K 7/10881* (2013.01); *G06F 3/033* (2013.01); *G06F 3/0482* (2013.01); *G06K 7/1413* (2013.01); *G06T 7/20* (2013.01); *G06T 7/70* (2017.01); *G06K 2007/10524* (2013.01); *H04W 4/80* (2018.02)

(58) Field of Classification Search
CPC .................................................. G06K 7/10881
USPC ..................................................... 235/462.45
See application file for complete search history.

(56) References Cited

U.S. PATENT DOCUMENTS

| | | | | |
|---|---|---|---|---|
| 9,390,596 B1 * | 7/2016 | Todeschini | .............. | H04W 4/80 |
| 9,946,963 B2 * | 4/2018 | Samara | .............. | G06K 17/0016 |
| 2012/0204307 A1 * | 8/2012 | De Mattei | .............. | G09F 27/00 2/69 |
| 2016/0188943 A1 * | 6/2016 | Franz | .................. | G06K 7/10841 705/21 |
| 2019/0018992 A1 * | 1/2019 | Bizoara | .............. | G06K 7/10544 |
| 2019/0101756 A1 * | 4/2019 | Todeschini | ......... | G02B 27/0172 |

* cited by examiner

*Primary Examiner* — Michael G Lee
*Assistant Examiner* — David Tardif
(74) *Attorney, Agent, or Firm* — Yuri Astvatsaturov

(57) ABSTRACT

A system configured to display an augmented-reality user interface for a barcode reader using a heads-up display assembly is provided. An augmented reality adapter having a camera and a presentation generator is configured to identify a unique identifier associated with a handheld barcode reader and provide an augmented reality display based on data captured by the handheld barcode reader. The presentation generator may position the augmented reality display based on a location of the unique identifier within the field of view (FOV) of the camera.

20 Claims, 15 Drawing Sheets

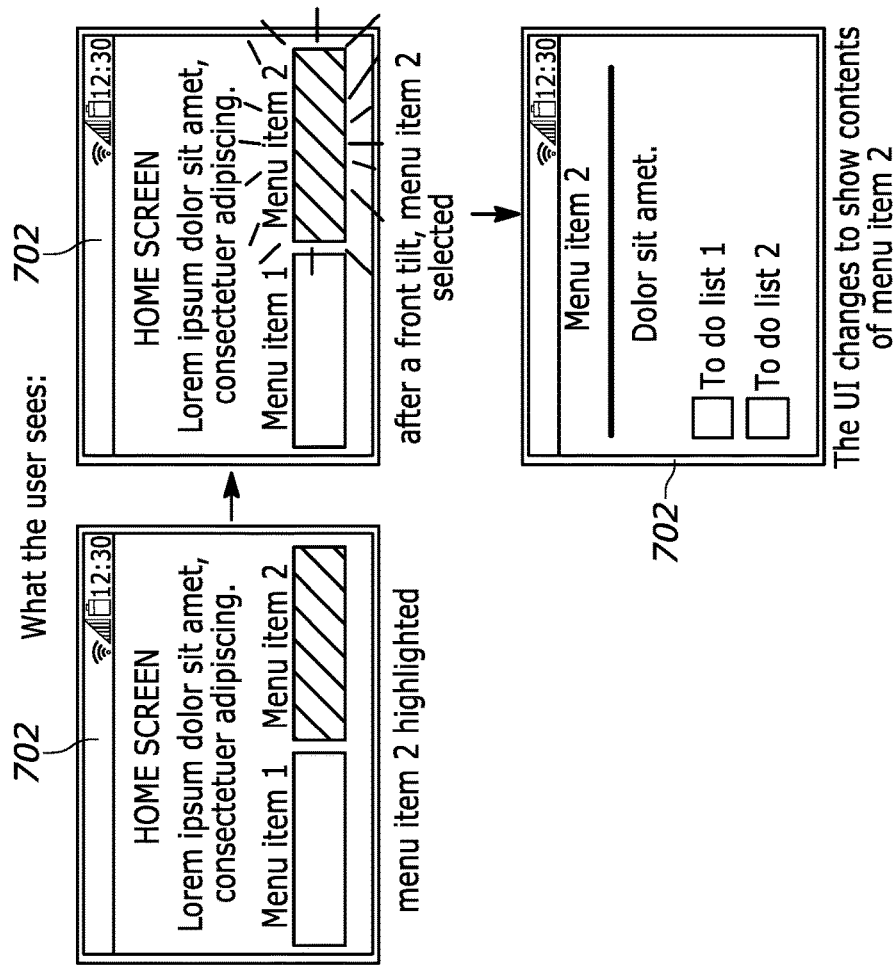
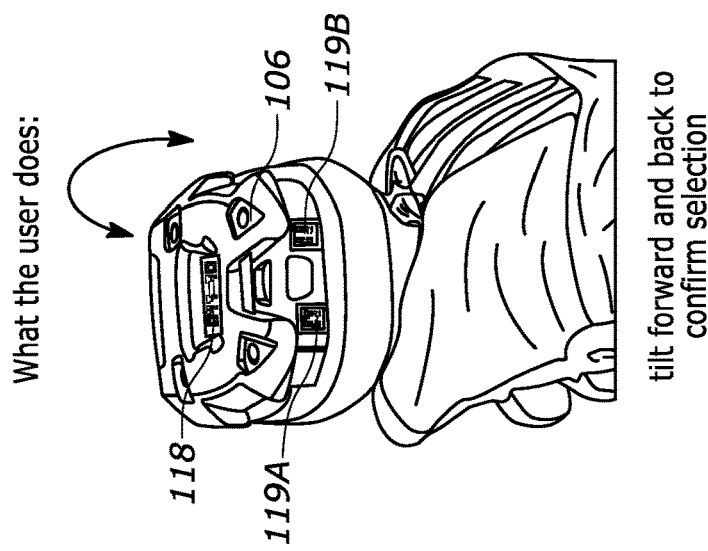
FIG. 9

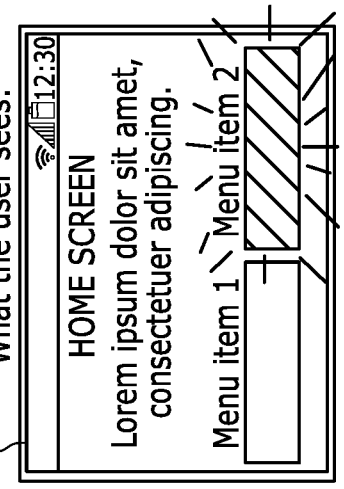
FIG. 11
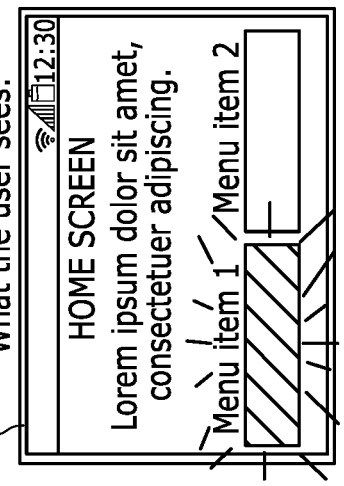

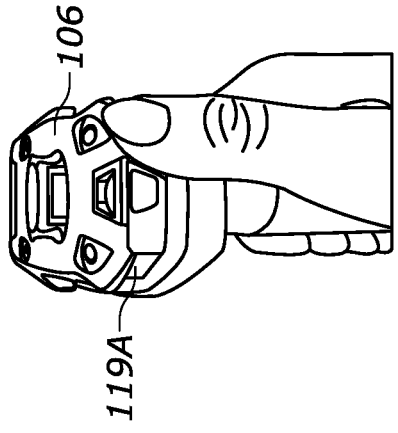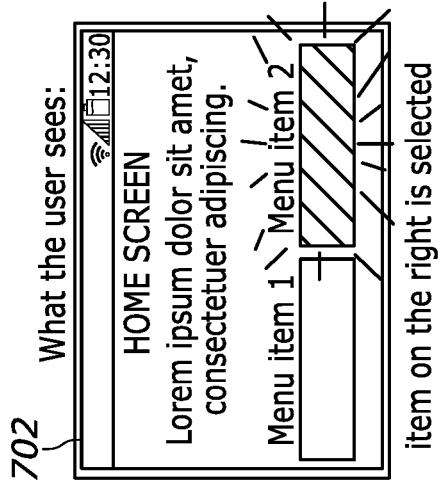
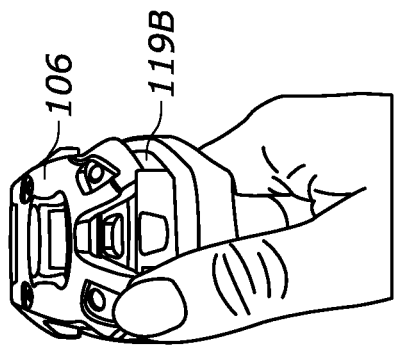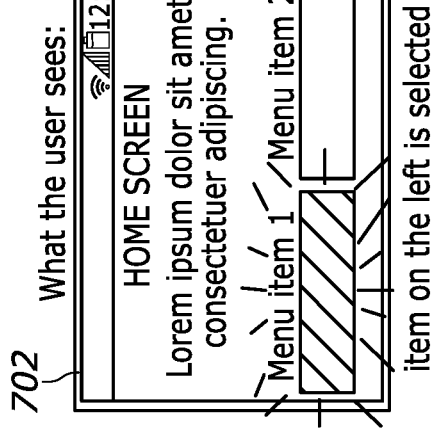
FIG. 12

US 10,699,087 B1

ALTERNATIVE METHOD TO INTERACT WITH A USER INTERFACE USING STANDARD BARCODE SCANNERS PAIRED UP WITH AN AUGMENTED REALITY HEADS UP DISPLAY

BACKGROUND OF THE INVENTION

The background description provided herein is for the purpose of generally presenting the context of the disclosure. Work of the presently named inventors, to the extent it is described in the background section, as well as aspects of the description that may not otherwise qualify as prior art at the time of filing, are neither expressly nor impliedly admitted as prior art against the present disclosure.

In an inventory environment, users may need to carry and operate a rugged barcode scanner. Rugged barcode scanners are typically handheld barcode scanners built to withstand various extreme temperatures and conditions, and, in some instances, can even withstand being dropped on the ground or into water. However, these rugged barcode scanners typically do not include screens. In particular, screens may be easily damaged in the extreme conditions where rugged barcode scanners may be used. However, because these rugged barcode scanners typically do not include a screen or other user interface, it is difficult for users to obtain real-time information captured by such rugged barcode scanners, or make selections related to this information.

In some instances, heads up displays (HUDs) can provide some of this information to users. However, users often have difficulty operating a HUD while operating a rugged barcode scanner because users often need to carry both the rugged barcode scanner and an object to be scanned. That is, a user carrying both the rugged barcode scanner and the object to be scanned will have his or her hands full, and cannot simultaneously operate HUD controls (typically wired or wireless touchpad controls) to input data or control the information shown by the HUD. Voice input controls for HUDs can also be problematic in loud inventory environments.

Accordingly, there exists a need for a way to input data and control the information displayed on a HUD while simultaneously operating a handheld rugged barcode scanner without a screen.

SUMMARY

The present application addresses the need for a way to input data and control the information displayed on a HUD while simultaneously operating a handheld rugged barcode scanner without a screen by pairing handheld barcode scanners (also called "barcode readers") with augmented reality HUDs to display a virtual "screen" (i.e., a user interface shown as an augmented reality display) to a user operating the handheld barcode reader. In particular, when a camera of a HUD captures an image of a unique identifier (e.g., a barcode or a QR code) attached to a handheld barcode reader without a screen, the HUD may display a virtual screen for the handheld barcode reader. For example, the virtual screen may display information associated with data captured by the handheld barcode reader, or may display prompts for the user to make various selections associated with the operation of the handheld barcode reader.

The virtual screen may be displayed so that it appears (to the user) to be anchored to the unique identifier attached to the handheld barcode reader. For instance, when the unique identifier moves upward within the camera's field of view (FOV), the virtual screen will move to up on the HUD, and when the unique identifier moves downward within the camera's FOV, the virtual screen will move down on the HUD.

Moreover, a user may make selections (e.g., in response to prompts displayed on the virtual screen) using the handheld barcode reader itself. For example, the user may tilt the handheld barcode reader to the left or to the right to choose between options displayed on the left or right of the virtual screen. Further, as another example, the user may tilt the handheld barcode reader forwards to make a selection shown on the virtual screen. As still another example, a user may activate a trigger of the handheld barcode reader to cause it to emit a light in order to confirm a selection shown on the virtual screen. Additionally, a user may cover a first target attached to or otherwise associated with a left portion of the handheld barcode reader, or a second target attached to or otherwise associated with a right portion of the handheld barcode reader with a thumb or finger in order to select an option shown on a left or right portion of the virtual screen. Accordingly, a user carrying both the handheld barcode reader and an object to be scanned can make selections and interact with the virtual screen using the handheld barcode reader.

In an embodiment, a system is provided. The system comprises: a handheld barcode reader, the handheld barcode reader having an identifier unique to the handheld barcode reader; and an augmented reality adapter having: a camera having a field of view (FOV); a presentation generator configured to provide an augmented reality display based on first data captured by the handheld barcode reader, wherein the position of the augmented reality display on the presentation generator is based on a location of the identifier within the FOV; a memory configured to store non-transitory computer executable instructions; and a processor configured to interface with the presentation generator, the camera, and the memory, and configured to execute the non-transitory computer executable instructions to cause the processor to: analyze images captured by the camera to identify the identifier of the handheld barcode reader; receive second data, based on first data captured by the handheld barcode reader associated with the identifier; and cause the presentation generator to display, via the augmented reality display, third data, based on the second data, wherein the presentation generator is configured to display the third data at a display time that is substantially simultaneous to a capture time at which the first data is captured by the handheld barcode reader.

In another embodiment, an augmented reality adapter is provided. The augmented reality adapter comprises: a camera having a field of view (FOV); a presentation generator configured to provide an augmented reality display based on first data captured by a handheld barcode reader having a unique identifier, wherein the position of the augmented reality display on the presentation generator is based on a location of the identifier within the FOV; a memory configured to store non-transitory computer executable instructions; and a processor configured to interface with the presentation generator, the camera, and the memory, and configured to execute the non-transitory computer executable instructions to cause the processor to: analyze images captured by the camera to identify the identifier of the handheld barcode reader; receive second data, based on first data captured by the handheld barcode reader associated with the identifier; and cause the presentation generator to display, via the augmented reality display, third data, based on the second data, wherein the presentation generator is configured to display the third data at a display time that is substantially simultaneous to a capture time at which the first data is captured by the handheld barcode reader.

In still another embodiment, a computer-implemented method is provided. The computer-implemented method comprises: analyzing, by a processor, images captured by a camera of an augmented reality adapter, the camera having a field of view (FOV), to identify an identifier unique to a handheld barcode reader and a location of the identifier within the FOV; receiving, by the processor, second data, based on first data captured by the handheld barcode reader associated with the identifier; and causing, by the processor, a presentation generator of the augmented reality adapter to display, via an augmented reality display, third data, based on the second data, wherein the position of the augmented reality display on the presentation generator is based on the location of the identifier within the FOV, and wherein the presentation generator is configured to display the third data at a display time that is substantially simultaneous to a capture time at which the first data is captured by the handheld barcode reader.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIGS. 8-12 illustrate examples of ways that a user may use a handheld barcode reader to interact with an augmented reality display.

Figure 1:
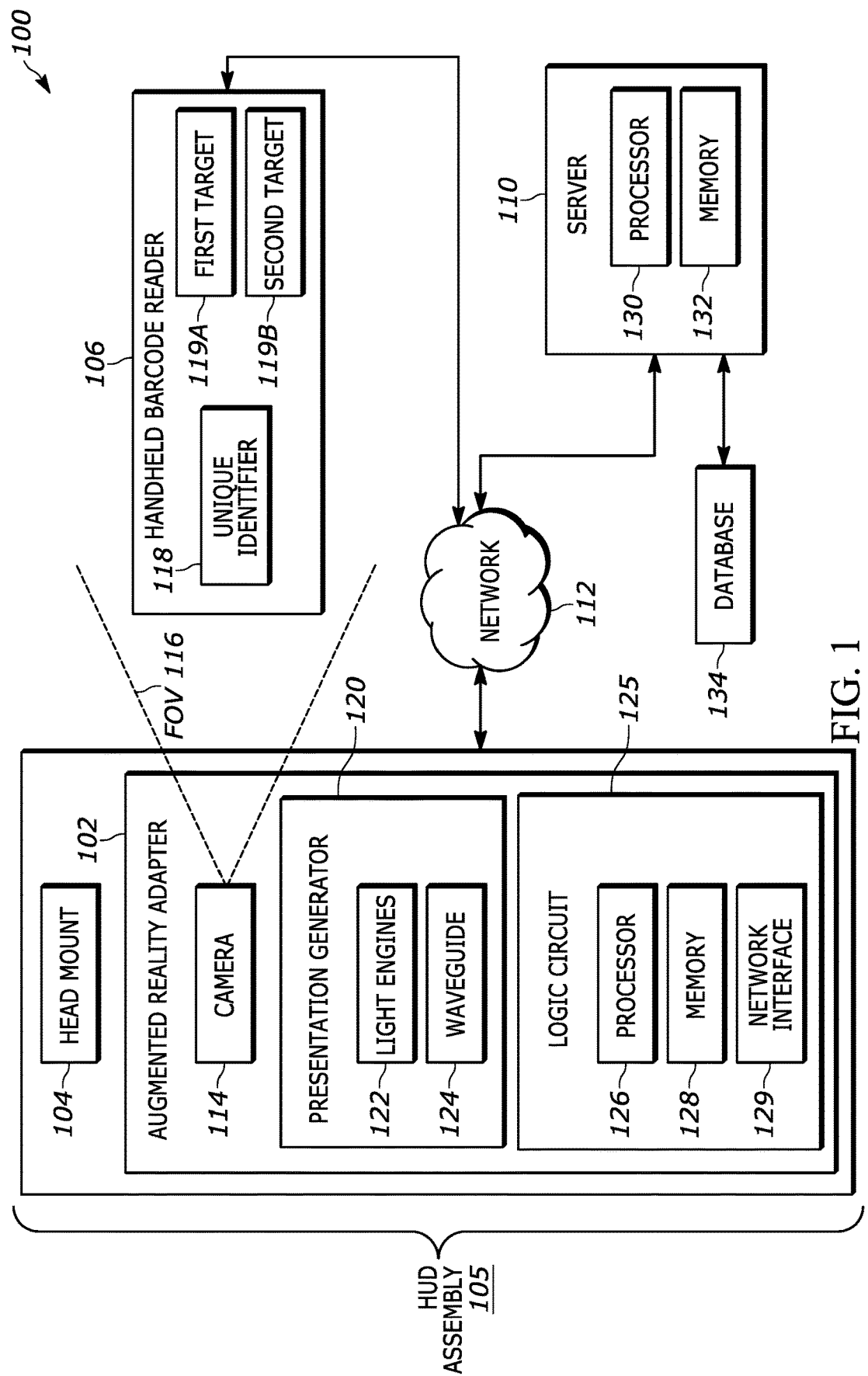
FIG. 1 illustrates a block diagram of an example system for displaying a user interface for a handheld barcode reader via a HUD assembly, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus components have been represented where appropriate by conventional symbols in the drawings, showing only those specific details that are pertinent to understanding the embodiments of the present invention so as not to obscure the disclosure with details that will be readily apparent to those of ordinary

DETAILED DESCRIPTION OF THE INVENTION

FIG. 1 illustrates a block diagram of an example system 100 for displaying a user interface for a barcode reader via a HUD assembly, in accordance with some embodiments. As shown in FIG. 1, an augmented reality adapter 102 and a head mount 104 may collectively form a HUD assembly 105. The head mount 104 may be constructed to mount the augmented reality adapter 102 to a head of a person such that the person can view an augmented reality display generated by the augmented reality adapter 102. The augmented reality adapter 102, a handheld barcode reader 106 and/or a server 110 may communicate with one another via a network 112, which may be, e.g., a wireless network.

The augmented reality adapter 102 may include a camera 114 configured to capture images within a FOV 116, representative of an environment surrounding the HUD assembly 105. In particular, the camera 114 may capture images of the handheld barcode reader 106 and a unique identifier 118 attached to or otherwise associated with the handheld barcode reader 106. Additionally, the camera 114 may capture images of a first target 119A and a second target 119B attached to or otherwise associated with the handheld barcode reader 106.

The augmented reality adapter 102 may further include a presentation generator 120 configured to generate an augmented reality display. The presentation generator 120 may include light engines 122 and a waveguide 124. The presentation generator 120 may receive data based on data captured by the handheld barcode scanner 106 to be displayed to a user via an augmented reality display, and the light engines 122 may convert elements of the augmented reality display into patterns and pulses of light. The light engines 122 may communicate the generated light to the waveguide 124, such that the images corresponding to an augmented reality display are displayed to the user via the waveguide 124. In some examples, the light engines 122 include optics that condition or manipulate (e.g., polarize and/or collimate) the generated light prior to providing the light to the waveguide 124. While the example presentation generator 120 utilizes the light engines 122 and the waveguide 124 to present visual components of the augmented reality display to the user, the augmented reality adapter 102 may employ any suitable image generating technology such as, for example, cathode ray tube (CRT) devices or scanning lasers.

In the example of FIG. 1, the light engines 122 utilize a light source (e.g., light emitting diodes (LEDs)) to generate light based on the received data. In some examples, the light engines 122 receive processed data in condition for immediate conversion into light. In some examples, the light engines 122 process raw image data before converting the image data into light. To perform such processing, the example light engines 122 of FIG. 1 may include and/or may be in communication with one or more logic circuits configured to process the image data.

The example waveguide 124 of FIG. 1 carries the light received from the light engines 122 in a direction and pattern corresponding to the image data. In examples disclosed herein, the example waveguide 124 of FIG. 1 carries the light received from the light engines in a direction such that the augmented reality display may be positioned based on the location of the unique identifier 118 within the FOV 116 of the camera 114. For instance, as the handheld barcode reader 106 moves throughout the FOV 116 of the camera 114, the unique identifier 118 attached to or otherwise associated with the handheld barcode reader 106 may move as well. Accordingly, the augmented reality display may be positioned so that it appears to the user to be "anchored" to the handheld barcode reader 106.

In the illustrated example, the waveguide 124 includes a plurality of internal surfaces that form a light guide to internally reflect the light as the light travels from an input to an output. The example waveguide 124 includes gratings at the output to diffract the light towards an eye of the user, thereby displaying the image to the user. In the illustrated example, the waveguide 124 is transparent such that the user can view surroundings simultaneously with the displayed image, or the surroundings only when no image is displayed on the waveguide 124. The example waveguide 124 of FIG. 1 includes first and second lenses arranged to be placed over first and second eyes, respectively, of the user. However, any suitable shape or size is possible for the waveguide 124.

The camera 114, the presentation generator 120, the example light engines 122, and/or, more generally, the augmented reality adapter 102 of FIG. 1 are implemented by hardware, software, firmware, and/or any combination of hardware, software and/or firmware. For instance, in some examples, the augmented reality adapter 102 includes a processor 126 and a memory 128.

In some examples, at least one of the example camera 114, the presentation generator 120, the example light engines 122, and/or, more generally, the augmented reality adapter 102 of FIG. 1 is implemented by a logic circuit 125. The logic circuit 125 may be a processing platform capable of executing machine-readable instructions to, for example, implement operations associated with the augmented reality adapter 102.

The logic circuit 125 may include a processor 126 such as, for example, one or more microprocessors, controllers, and/or any suitable type of processor. The logic circuit 125 may further include includes memory 128 (e.g., volatile memory, non-volatile memory) accessible by the processor 126 (e.g., via a memory controller). The example processor 126 interacts with the memory 128 to obtain, for example, machine-readable instructions stored in the memory 128. Additionally or alternatively, machine-readable instructions may be stored on one or more removable media (e.g., a compact disc, a digital versatile disc, removable flash memory, etc.) that may be coupled to the logic circuit 125 to provide access to the machine-readable instructions stored thereon. In particular, the machine-readable instructions stored on the memory 128 may include instructions for carrying out any of the steps of any of the methods described in greater detail below at FIGS. 13-16.

The logic circuit 125 may further include a network interface 129 to enable communication with other machines via, for example, one or more networks. The example network interface 129 includes any suitable type of communication interface(s) (e.g., wired and/or wireless interfaces) configured to operate in accordance with any suitable protocol(s).

In some examples, the augmented reality adapter 102 may communicate directly with the handheld barcode reader 106 (e.g., via the network 112, or via a short range wireless connection) in order to, for example, receive data based on data captured by the handheld barcode reader 106. For instance, the data captured by the handheld barcode reader 106 may include, e.g., indications/identifications of inventory items that have been scanned, indications/identifications of inventory items still to be scanned, numbers of items scanned or to be scanned, etc.

Additionally or alternatively, the handheld barcode reader 106 may communicate captured data to the server 110 (e.g., via the network 112). For instance, the server 110 may include a processor 130 such as, for example, one or more microprocessors, controllers, and/or any suitable type of processor. The server 110 may further include includes memory 132 (e.g., volatile memory, non-volatile memory) accessible by the processor 126 (e.g., via a memory controller). The example processor 130 interacts with the memory 132 to obtain, for example, machine-readable instructions or other data stored in the memory 132. Additionally or alternatively, machine-readable instructions may be stored on one or more removable media (e.g., a compact disc, a digital versatile disc, removable flash memory, etc.) that may be coupled to the server 110 to provide access to the machine-readable instructions stored thereon.

Accordingly, in some examples the server 110 may store captured data from the handheld barcode reader 106 in the memory 132 or in the database 134, and may in turn communicate the captured data (and/or data based on the captured data) to the augmented reality adapter 102. Moreover, in some examples, the server 110 may perform additional processing steps on the captured data from the handheld barcode reader 106, e.g., to generate augmented reality displays based on the data from the handheld barcode reader 106 to be displayed to a user of the HUD assembly 105. Moreover, the machine-readable instructions stored on the memory 130 may include instructions for carrying out any of the steps of any of the methods described in greater detail below at FIGS. 13-16.

Figure 2A:
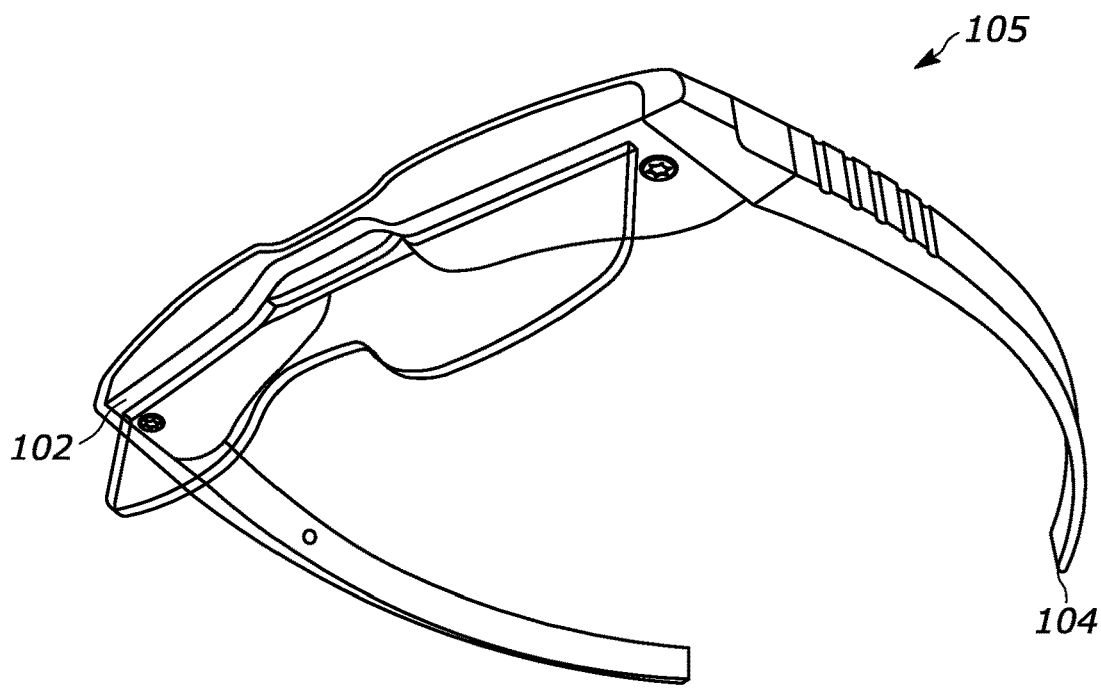
FIG. 2A and FIG. 2B illustrate an example HUD assembly, in accordance with some embodiments.
Figure 2B:
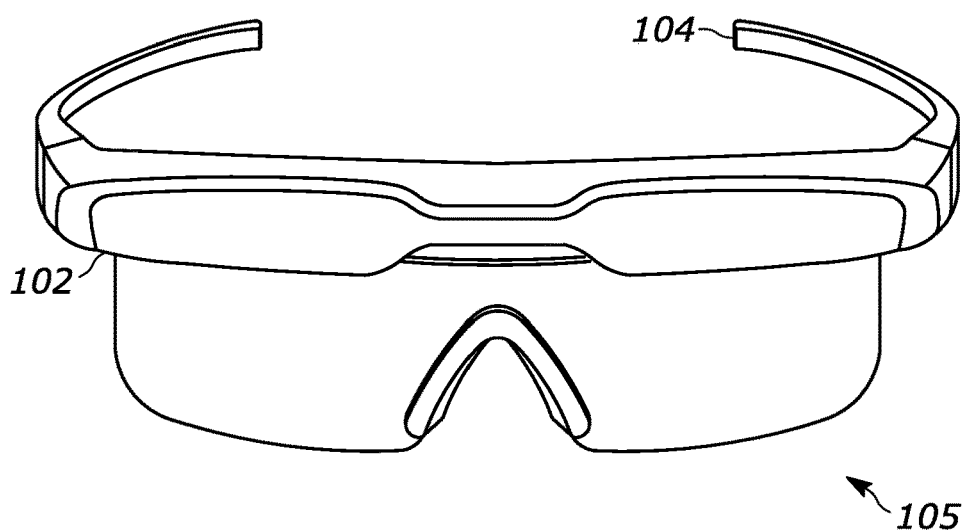

Turning now to FIGS. 2A and 2B, an example HUD assembly 105 is illustrated in accordance with an embodiment. The example HUD assembly 105 of FIGS. 2A and 2B includes an augmented reality adapter 102 and an example head mount 104. The example augmented reality adapter 102 of FIGS. 2A and 2B houses or carries components configured to generate, for example, an audiovisual presentation for consumption by a user wearing the example HUD assembly 105 of FIGS. 2A and 2B.

Figure 3:
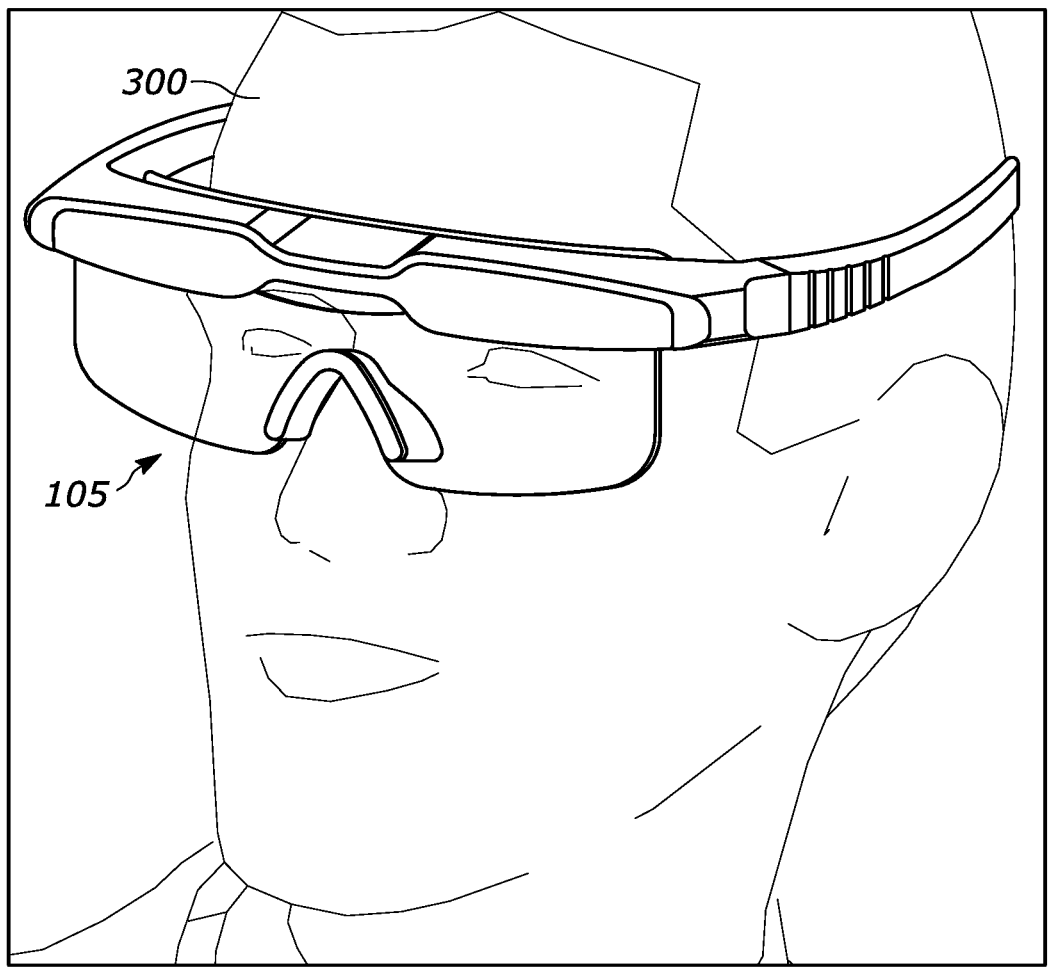
FIG. 3 illustrates an example HUD assembly mounted to a head of a user, in accordance with some embodiments.

FIG. 3 illustrates the example HUD assembly 105 of FIGS. 2A and 2B mounted to a head 300 of a user.

Figure 4:
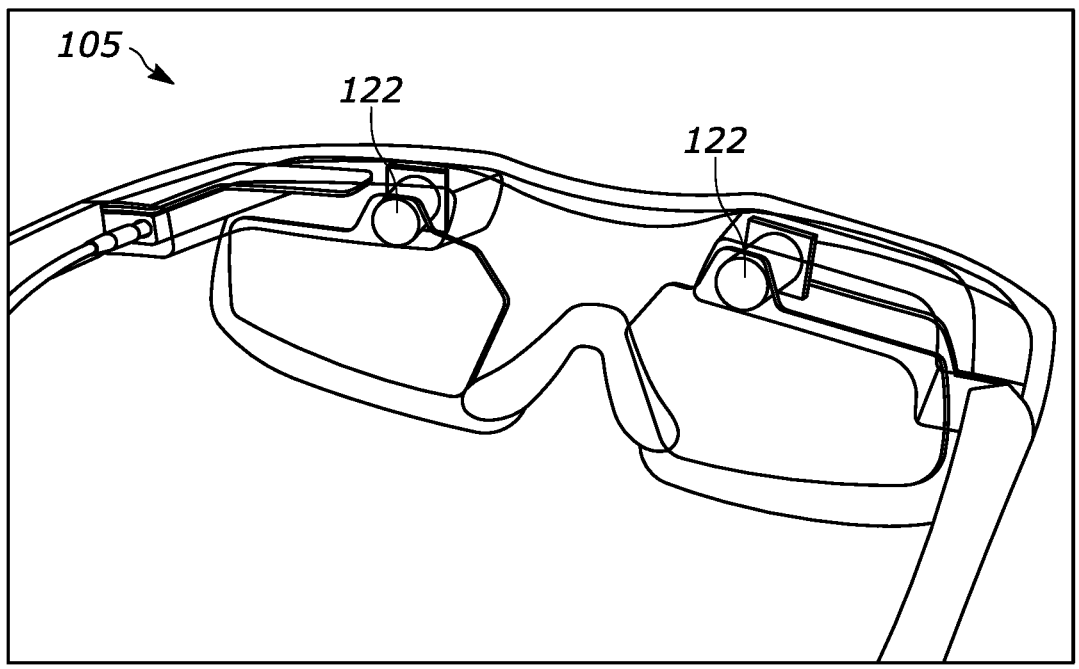
FIG. 4 illustrates example light engines mounted to an example HUD assembly, in accordance with some embodiments.
Figure 7:
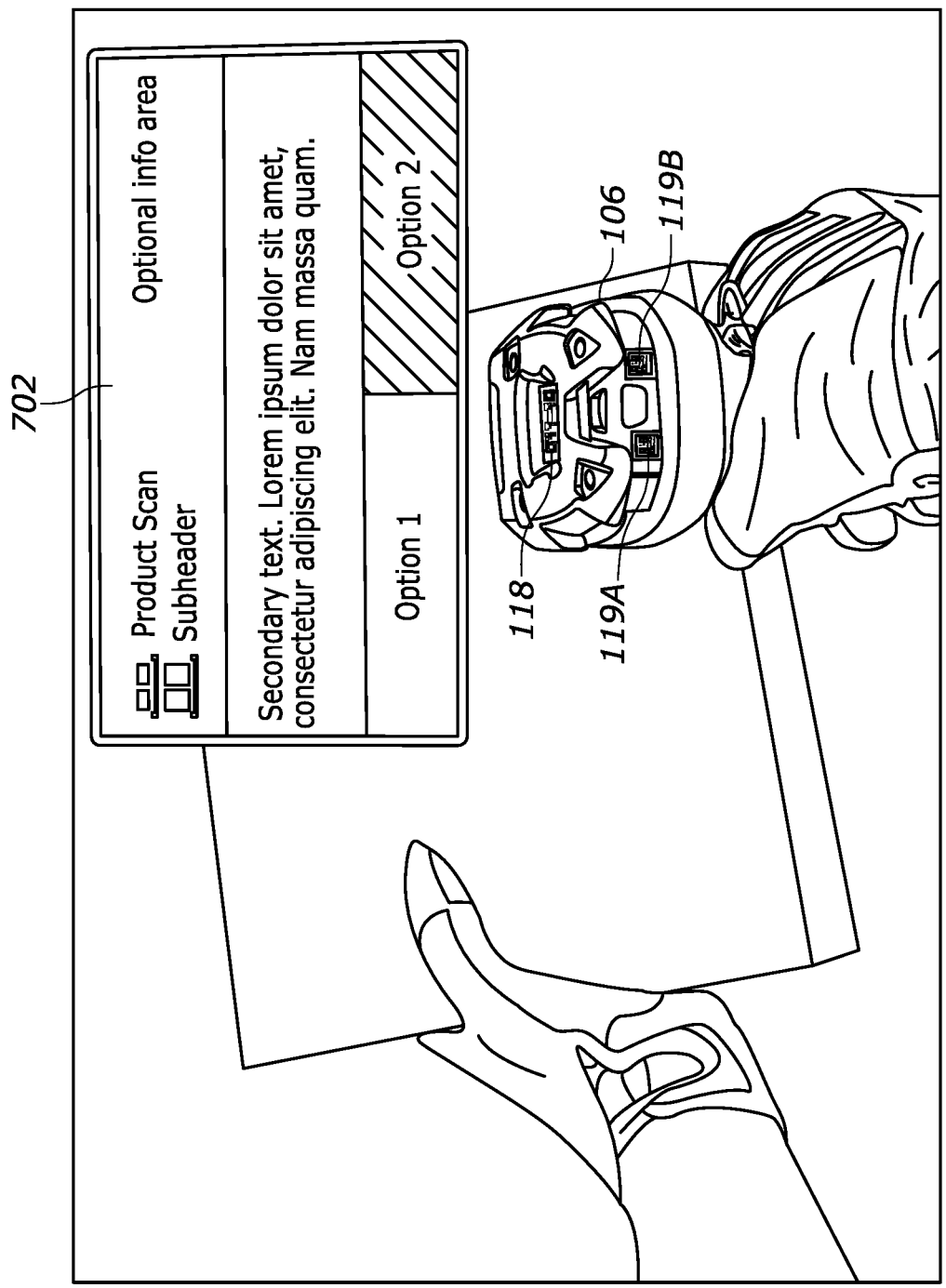
FIG. 7 illustrates an example augmented reality display with a position on a presentation generator that is based on the location of a unique identifier associated with a handheld barcode reader within the FOV of a camera, as it would be seen by a user, in accordance with an embodiment.

FIG. 4 illustrates example light engines 122 that display visual media (e.g., an augmented reality display as shown in FIG. 7) to the user of the HUD assembly. As described above, the light engines 122 generate light to be carried by a waveguide. While the example light engines 122 of FIG. 4 are positioned above each eyepiece, the light engines 122 may be positioned in any suitable location such as, for example, at the edge of the frames.

Figure 5:
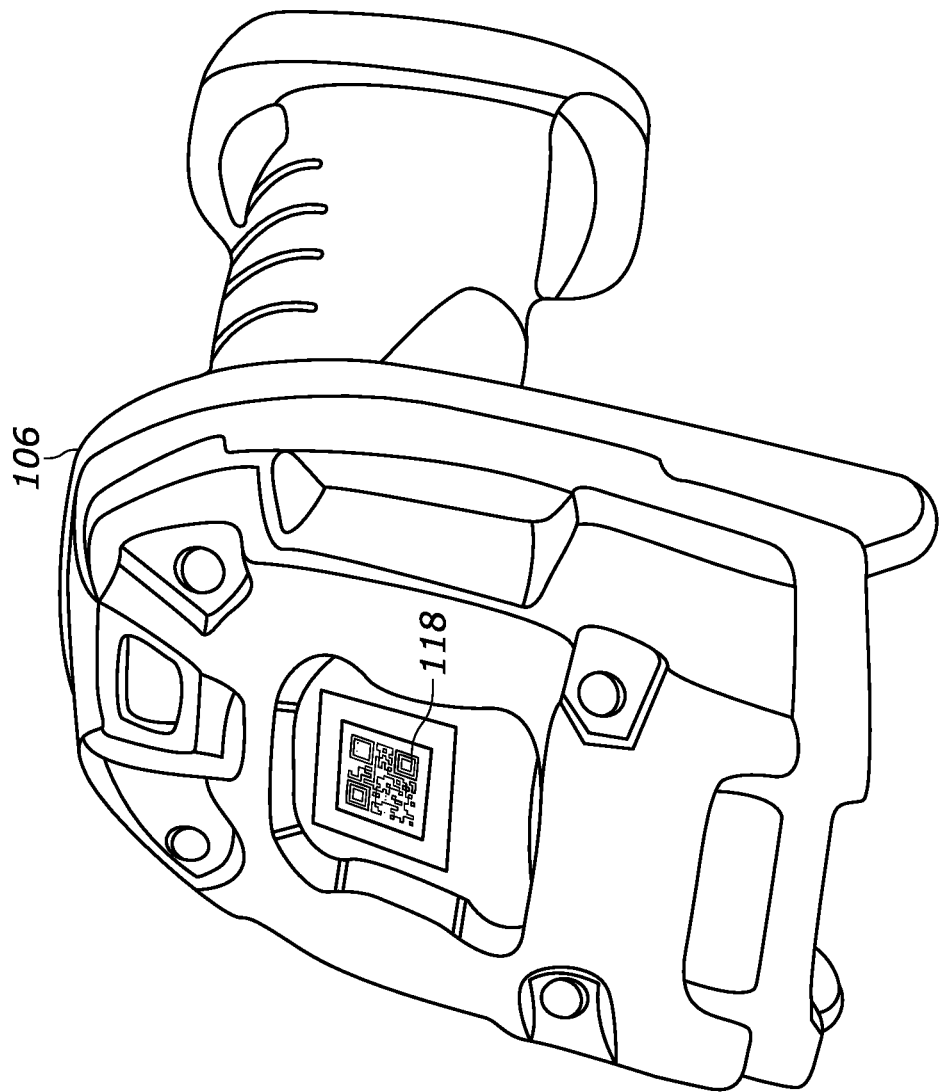
FIG. 5 illustrates an example unique identifier associated with a handheld barcode reader, in accordance with some embodiments.

FIG. 5 illustrates an example unique identifier 118 associated with and attached to a handheld barcode reader 106, in accordance with some embodiments. For example, the unique identifier 118 may be a particular barcode, a QR code, or other code associated with a particular handheld barcode reader 106. In some examples, the unique identifier 118 may be printed on a sticker or may otherwise be removably attached to a housing of the handheld barcode reader 106. In other examples, the unique identifier 118 may be permanently attached to or printed on the housing of the handheld barcode reader 106.

Figure 6:
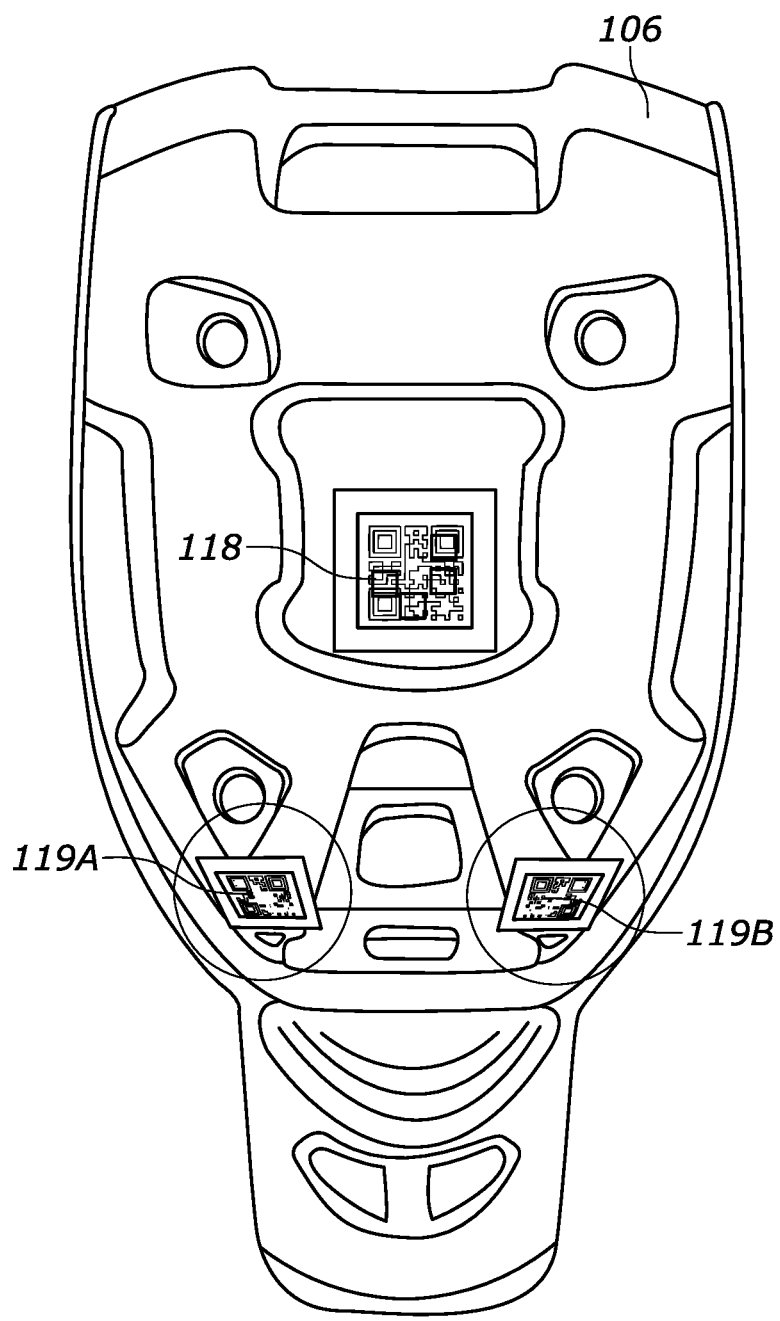
FIG. 6 illustrates example first and second targets associated with a handheld barcode reader, in accordance with some embodiments.

FIG. 6 illustrates an example first target 119A and an example second target 119B associated with and attached to a handheld barcode reader 106, in accordance with some embodiments. In some examples, the first target 119A and second target 119B may be attached to the handheld barcode reader 106 in addition to the unique identifier 118. For instance, the first target 119A and second target 119B may include barcodes, QR codes, or other codes associated with the handheld barcode reader 106. For instance, the first target 119A may be a first barcode, QR code, or other code associated with the handheld barcode reader 106, while the second target 119B is a second barcode, QR code, or other code associated with the handheld barcode reader 106, and the unique identifier 118 is a third barcode, QR code, or other code associated with the handheld barcode reader 106. In other examples, the first target 119A and second target 119B may be existing features of the handheld barcode reader 106. For example, the first target 119A may be a first LED of the handheld barcode reader 106, while the second target 119B is a second LED of the handheld barcode reader 106.

FIG. 7 illustrates an example augmented reality display 702 with a position on a presentation generator that is based on the location of a unique identifier 118 associated with a handheld barcode reader 106 within the FOV of a camera, as it would be seen by a user, in accordance with an embodiment. As shown in FIG. 7, the augmented reality display 702 appears to be located directly above the location of the unique identifier 118 from the point of view of a user. In particular, the augmented reality display 702 may be anchored to the unique identifier 118, and its position on the presentation generator may change as the location of the unique identifier 118 changes within the FOV of the camera.

Figure 8:
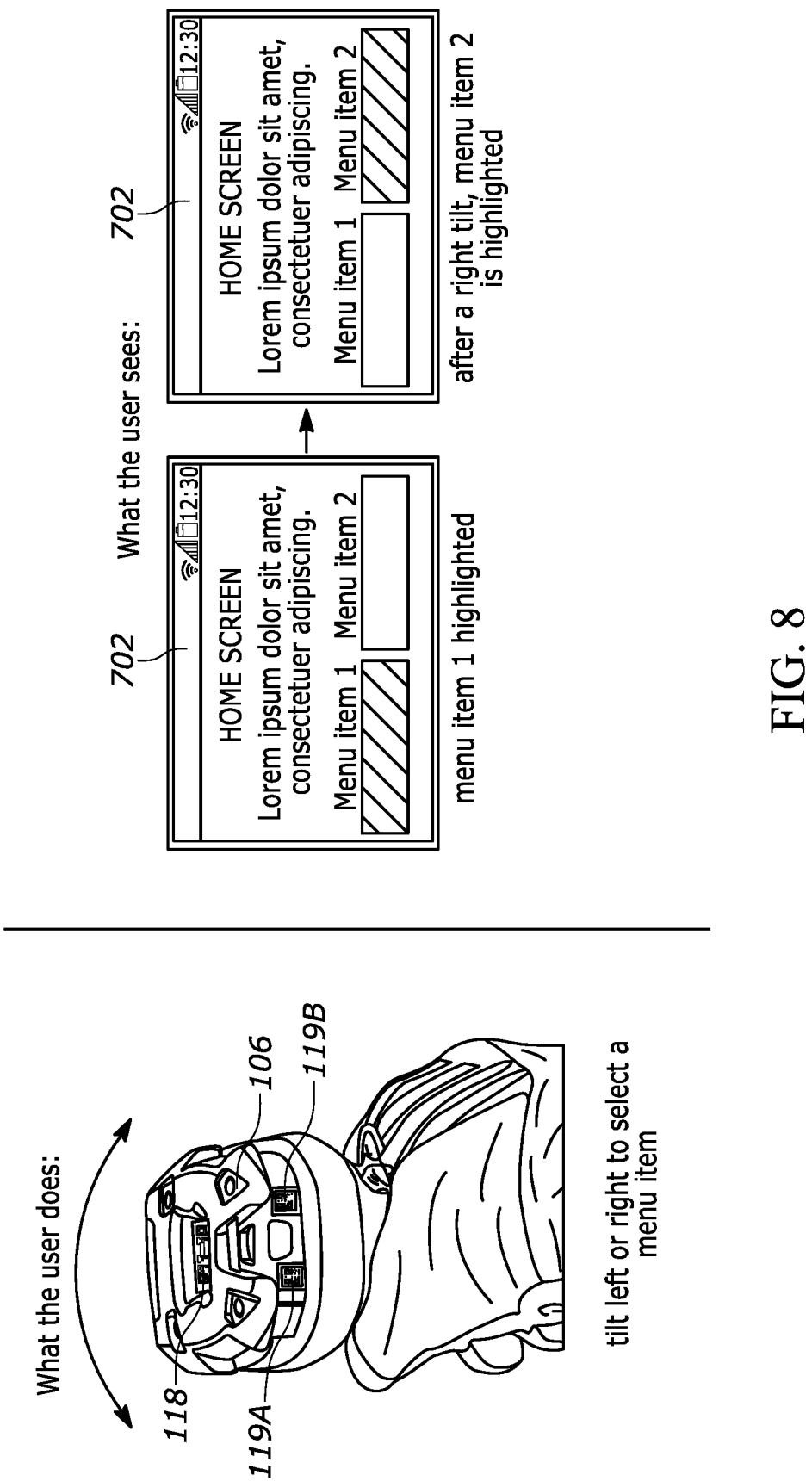
Figure 10:
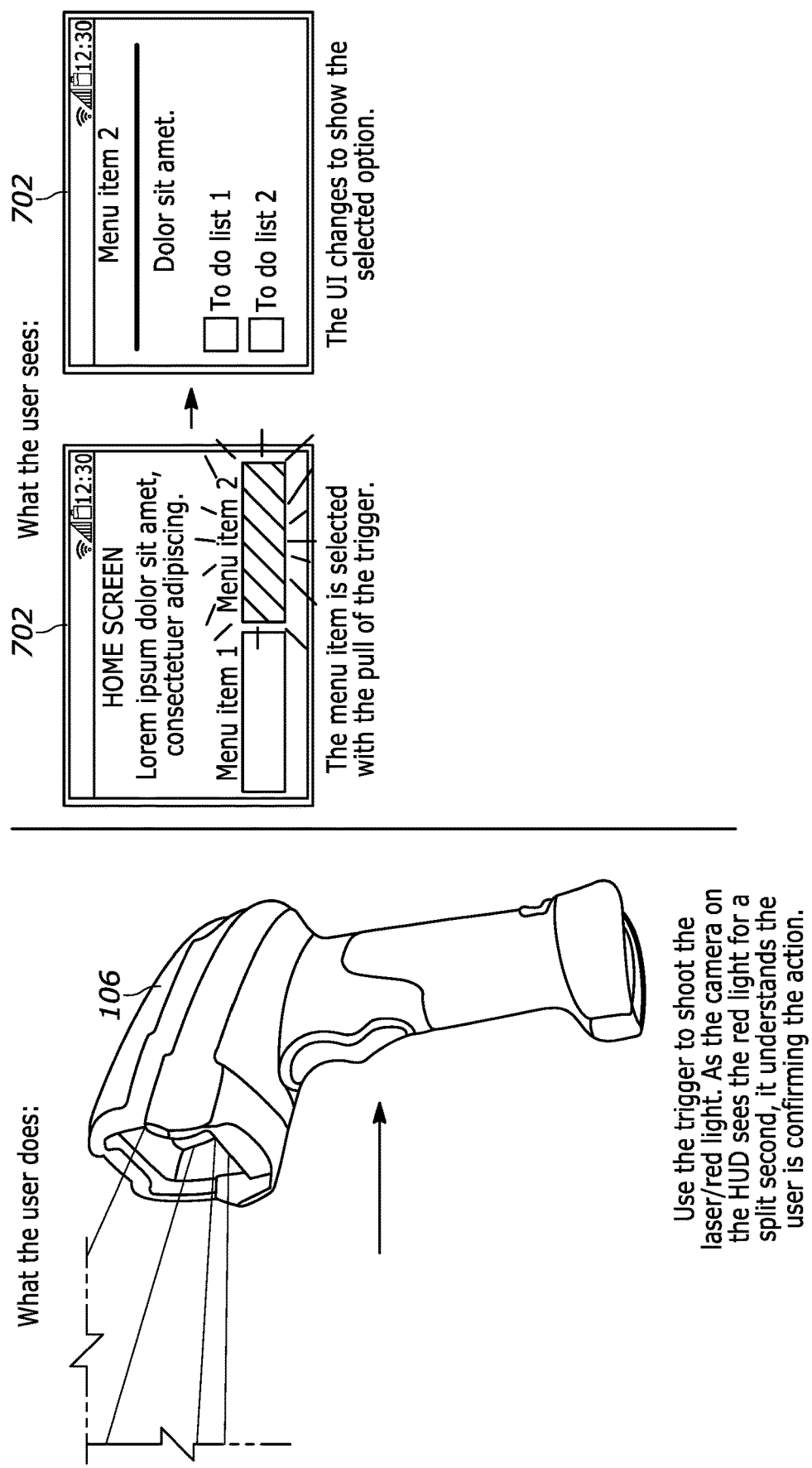

FIGS. 8-12 illustrate examples of ways that a user may use the handheld barcode reader 106 to interact with the augmented reality display 702. For example, as shown in FIG. 8, a user may tilt the handheld barcode reader 106 to the left or to the right, respectively, to select an option shown on a left or right portion of the augmented reality display 702. As another example, as shown in FIG. 9, a user may tilt the handheld barcode reader 106 forward and back to confirm a selection shown on the augmented reality display 702. As still another example, as shown in FIG. 10, a user may activate a trigger of the handheld barcode reader 106 to cause it to emit a light in order to confirm a selection shown on the augmented reality display 702. Additionally, as shown in FIGS. 11 and 12, a user may cover a first target 119A attached to or otherwise associated with a left portion of the handheld barcode reader 106, or a second target 119B attached to or otherwise associated with a right portion of the handheld barcode reader 106 with a thumb or finger, respectively, in order to select an option shown on a left or right portion of the augmented reality display 702.

Figure 13:
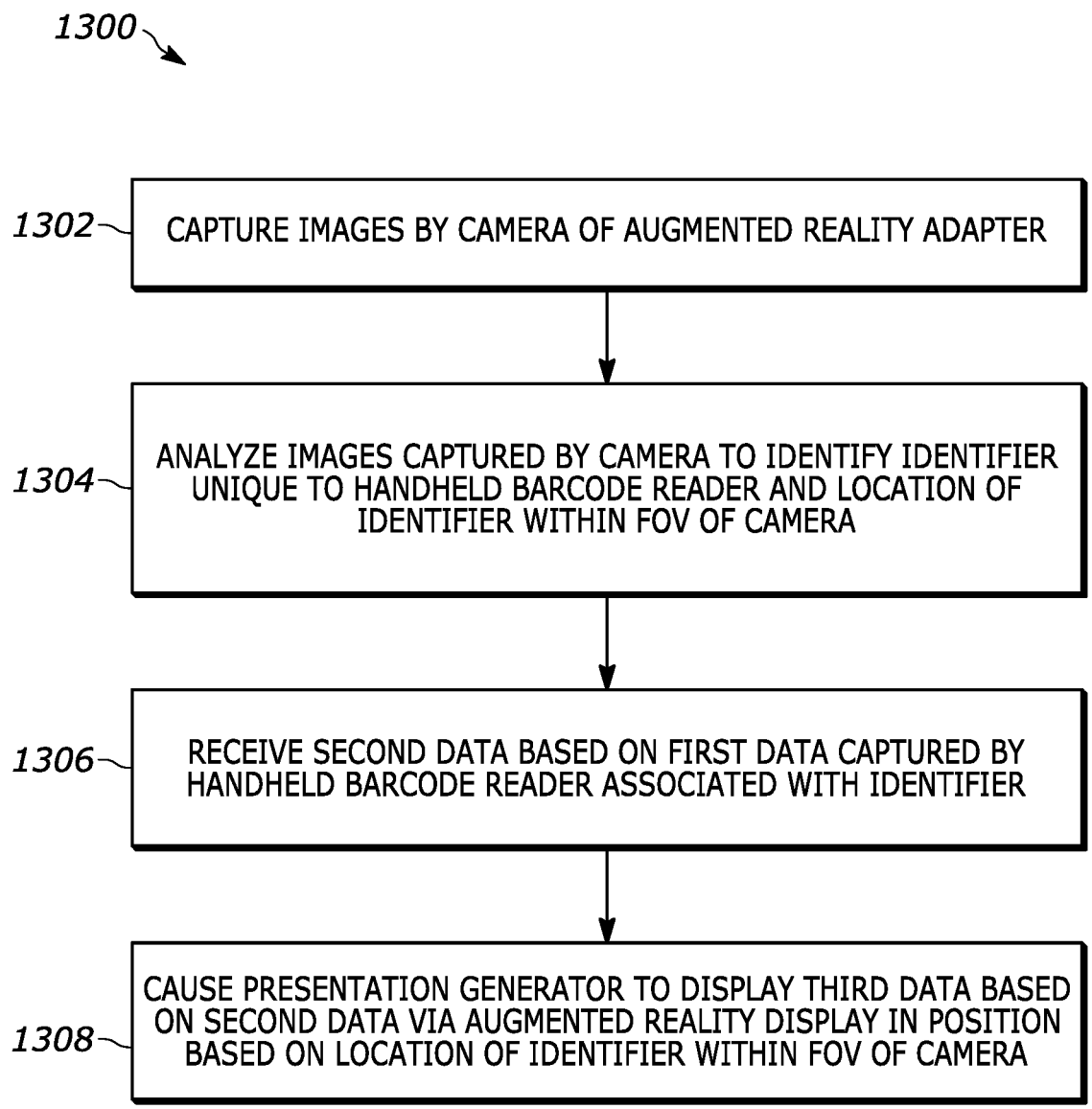
FIG. 13 illustrates a flow diagram of an exemplary computer-implemented method 1300 for displaying a user interface for a handheld barcode reader via a HUD, in accordance with some embodiments.

FIG. 13 illustrates a flow diagram of an exemplary computer-implemented method 1300 for displaying a user interface for a barcode reader via a HUD, in accordance with some embodiments. One or more steps of the method 1300 may be implemented as a set of instructions stored on a computer-readable memory and executable on one or more processors.

At block 1302, a camera of an augmented reality adapter (e.g., associated with a HUD) may capture images. The camera may have a FOV and may capture images within the FOV.

At block 1304, images captured by the camera may be analyzed to identify an identifier unique to a handheld barcode reader and a location of the identifier within the FOV of the camera. For example, the identifier may be a unique barcode or QR code associated with the handheld barcode reader and attached to a housing of the handheld barcode reader, e.g., as shown in FIG. 5.

At block 1306, as the handheld barcode reader associated with the identifier captures first data, a processor associated with the augmented reality adapter may receive second data based on the first data. In some instances, the handheld barcode reader and the augmented reality adapter may communicate via a short range wireless connection, and the augmented reality adapter may receive the second data directly from the handheld barcode reader. In other instances, the handheld barcode reader may communicate with a server and may transmit or otherwise provide the first data to the server, which may in turn convert the first data to second data and transmit the second data to the augmented reality adapter.

At block 1308, the processor may cause a presentation generator of the augmented reality adapter to display third data, based on the second data, via an augmented reality display of the augmented reality adapter. The third data may include information based on scans by the handheld barcode reader, such as indications/identifications of inventory items that have been scanned, indications/identifications of inventory items still to be scanned, numbers of items scanned or to be scanned, etc. Additionally, in some examples, the third data may include options or other prompts requiring user input.

Furthermore, the third data displayed via the augmented reality display of the augmented reality adapter may be displayed at a display time that is substantially simultaneous to a capture time at which the handheld barcode reader captures the first data. For example, as the handheld barcode reader scans barcodes, information associated with those barcodes may be displayed via the augmented reality display almost immediately.

The augmented reality display may be a "virtual screen" user interface for the handheld barcode reader, e.g., as shown in FIG. 7. In particular, the position of the augmented reality display on the presentation generator may be based on the location of the identifier within the FOV of the camera. For instance, when the identifier is located in an upper-right corner of the FOV of the camera, the augmented reality display may be positioned in an upper-right corner of the presentation generator, and as the identifier moves within the FOV of the camera, the augmented reality display may follow the identifier on the presentation generator. In other words, for a user of the augmented reality adapter, the augmented reality display may appear to be anchored to the identifier (and, by proxy, anchored to the handheld barcode reader).

Figure 14:
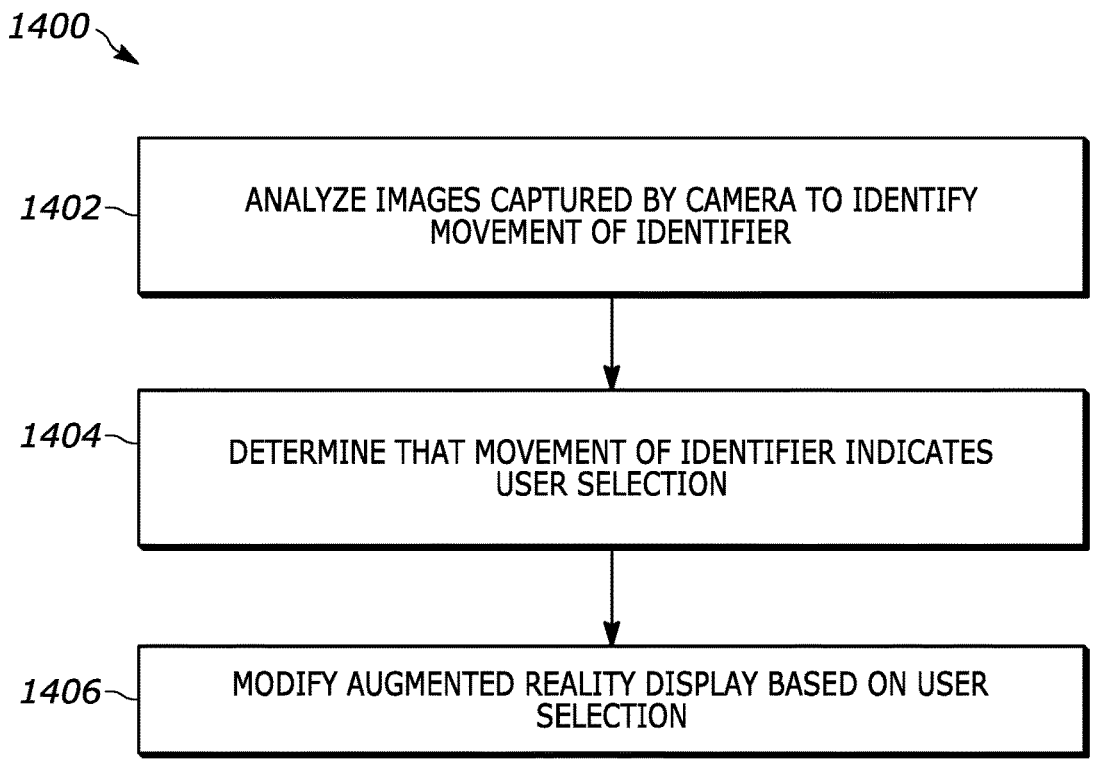
FIG. 14 illustrates a flow diagram of an exemplary computer-implemented method for changing a user interface for a handheld barcode reader displayed via a HUD based on user input indicated by a movement of the handheld barcode reader, in accordance with some embodiments.
Figure 15:
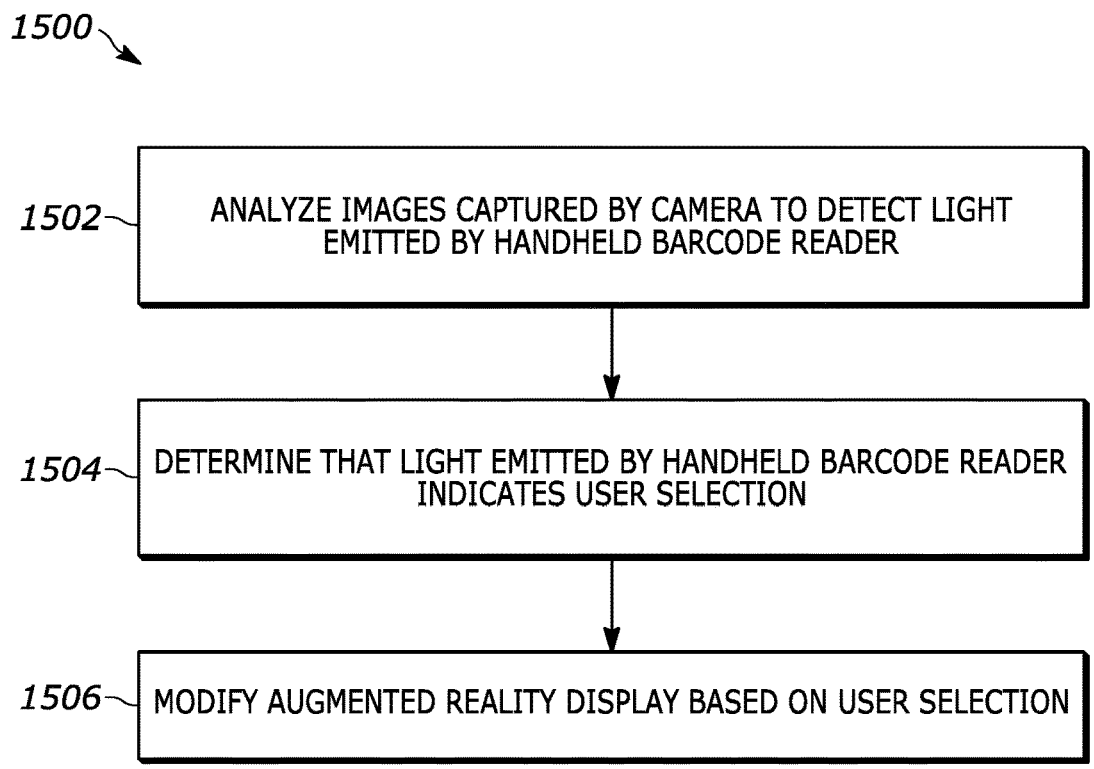
FIG. 15 illustrates a flow diagram of an exemplary computer-implemented method for changing a user interface for a handheld barcode reader displayed via a HUD based on user input indicated by a light emitted by the handheld barcode reader, in accordance with some embodiments.
Figure 16:
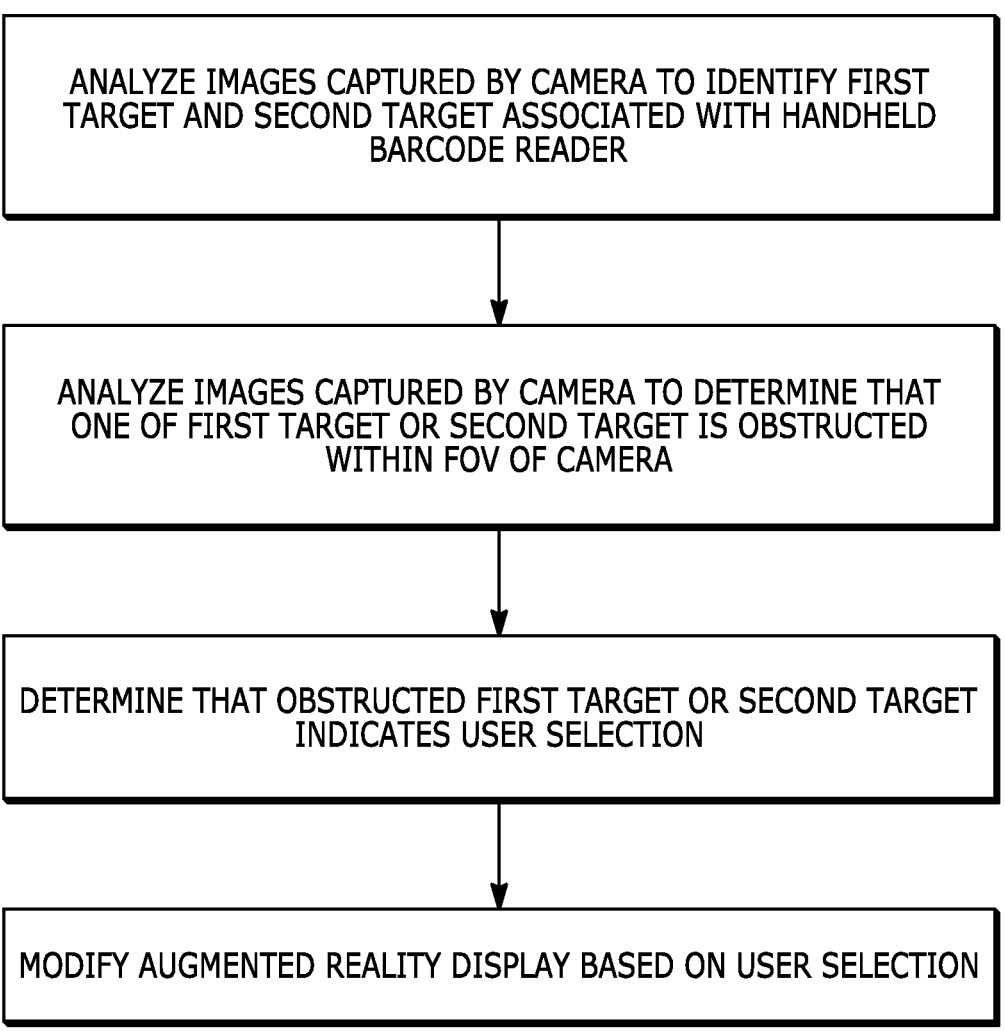
FIG. 16 illustrates a flow diagram of an exemplary computer-implemented method for changing a user interface for a handheld barcode reader displayed via a HUD based on user input indicated by an obstruction of a target associated with the handheld barcode reader, in accordance with some embodiments.

In various examples, the method 1300 may proceed to include steps of method 1400, as discussed in greater detail with respect to FIG. 14, method 1500, as discussed in greater detail with respect to FIG. 15, and/or method 1600, as discussed in greater detail with respect to FIG. 16.

FIG. 14 illustrates a flow diagram of an exemplary computer-implemented method 1400 for changing a user interface for a barcode reader displayed via a HUD based on user input indicated by a movement of the barcode reader, in accordance with some embodiments. One or more steps of the method 1400 may be implemented as a set of instructions stored on a computer-readable memory and executable on one or more processors.

At block 1402, the processor may analyze the images captured by the camera (e.g., at block 1302) to detect a movement of the identifier associated with the handheld barcode reader within the FOV. In some examples, detecting the movement of the identifier within the FOV may include detecting a direction of the movement of the identifier. For example, a user may tilt the handheld barcode reader to the left or right (e.g., as shown in FIG. 8), causing the identifier to move to the left or right as the handheld barcode reader is tilted. As another example, a user may tilt the handheld barcode reader forwards and backwards (e.g., as shown in FIG. 9), causing the identifier to move forwards and backwards as the handheld barcode reader is tilted.

At block 1404, the processor may determine that the movement of the identifier indicates a user selection. For instance, determining that the movement of the identifier indicates a user selection may include distinguishing a movement indicating a user selection from a movement due to the handheld barcode reader simply being moved as the user moves the handheld barcode reader to scan objects. For example, a faster movement may indicate a likely user selection, while a slower movement indicates that the user is simply moving the handheld barcode reader to scan objects. Moreover, a movement when a prompt or options are being displayed via the augmented reality display may indicate a likely user selection, while a movement when no prompts or options are being displayed via the augmented reality display may indicate that the user is simply moving the handheld barcode reader to scan objects.

Furthermore, in some examples, the user selection may be determined based on the direction of the movement of the identifier. For instance, when a user tilts the handheld barcode reader to the left, the identifier may move to the left, indicating that the user is selecting an option displayed on a left portion of the augmented reality display, and when a user tilts the handheld barcode reader to the right, the identifier may move to the right, indicating that the user is selecting an option displayed on a right portion of the augmented reality display. Moreover, in some examples, a forwards/backwards motion (compared to a right/left motion) may indicate that a user is confirming a selection.

At block 1406, the processor may modify the augmented reality display based on the user selection, e.g., as shown in FIG. 8 or FIG. 9. For instance, if the processor determines that a user has selected an option displayed on a left portion of the augmented reality display, the processor may modify the augmented reality display to show more information related to the option that was displayed on the left portion of the augmented reality display. Similarly, if the processor determines that a user has confirmed a selection, the processor may modify the augmented reality display to display a confirmation of the selection.

FIG. 15 illustrates a flow diagram of an exemplary computer-implemented method 1500 for changing a user interface for a barcode reader displayed via a HUD based on user input indicated by a light emitted by the barcode reader, in accordance with some embodiments. One or more steps of the method 1500 may be implemented as a set of instructions stored on a computer-readable memory and executable on one or more processors.

At block 1502, the processor may analyze the images captured by the camera (e.g., at block 1302) to detect a light emitted by the handheld barcode reader. In some examples, detecting the light emitted by the handheld barcode reader may include detecting a location of the light relative to the location of the identifier within the FOV of the camera.

At block 1504, the processor may determine that the light emitted by the handheld barcode reader indicates a user selection. For example, a user may activate a trigger of the handheld barcode reader to emit a light typically used to scan barcodes in order to make a selection, e.g., as shown in FIG. 10. In some examples, the user may simply activate a trigger of the handheld barcode reader to cause the handheld barcode reader to emit a light in order to confirm a selection. In other examples, the user selection may be determined based on the location of the light relative to the location of the identifier within the FOV of the camera. For example, a user may turn the handheld barcode reader to the left and activate a trigger of the handheld barcode reader to cause the handheld barcode scanner to emit a light facing to the left make a selection of an option displayed on a left portion of the augmented reality display, or may turn the handheld barcode reader to the right and activate a trigger of the handheld barcode reader to cause the handheld barcode scanner to emit a light facing to the right in order to make a selection of an option displayed on a right portion of the augmented reality display.

Moreover, in some examples, determining that the light emitted by the handheld barcode reader indicates a user selection may include analyzing the images captured by the camera to determine that the light emitted by the handheld barcode reader does not impinge on a barcode. For example, a user simply using the handheld barcode to scan barcodes of inventory items may not be intending to make a selection.

At block 1506, the processor may modify the augmented reality display based on the user selection, e.g., as shown in FIG. 10. For instance, the processor determines that a user has selected an option displayed on a left portion of the augmented reality display, the processor may modify the augmented reality display to show more information related to the option that was displayed on the left portion of the augmented reality display. Similarly, if the processor determines that a user has confirmed a selection, the processor may modify the augmented reality display to display a confirmation of the selection.

FIG. 16 illustrates a flow diagram of an exemplary computer-implemented method 1600 for changing a user interface for a barcode reader displayed via a HUD based on user input indicated by an obstruction of a target associated with the barcode reader, in accordance with some embodiments. One or more steps of the method 1600 may be implemented as a set of instructions stored on a computer-readable memory and executable on one or more processors.

At block 1602, the processor may analyze the images captured by the camera (e.g., at block 1302) to identify a first target associated with the handheld barcode reader and a second target associated with the handheld barcode reader (e.g., at a first time). In some examples, the first and second targets may be barcodes or QR codes affixed to the handheld barcode reader, e.g., as shown in FIG. 6. In other examples, the first and second targets may be first and second LEDs of the handheld barcode reader, e.g., as shown in FIG. 12.

At block 1604, the processor may analyze the images captured by the camera (e.g., at a second time after the first time) to determine that one of the first target or the second target is obstructed within the FOV of the camera. For example, a user may cover the first or second target with his or her finger or thumb, causing the target to be obstructed within the FOV of the camera, e.g., as shown in FIG. 11 or FIG. 12.

At block 1606, the processor may determine that the obstructed first target or second target indicates a user selection. For example, the processor may determine that an obstructed first target located on a left portion of the handheld barcode reader indicates that a user has selected an option presented on a left portion of the augmented reality display. Similarly, the processor may determine that an obstructed second target located on a right portion of the handheld barcode reader indicates that the user has selected an option presented on a right portion of the augmented reality display.

At block 1608, the processor may modify the augmented reality display based on the user selection, e.g., as shown in FIG. 11 or FIG. 12. For instance, the processor determines that a user has selected an option displayed on a left portion of the augmented reality display, the processor may modify the augmented reality display to show more information related to the option that was displayed on the left portion of the augmented reality display.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations. Some example logic circuits are hardware that executes machine-readable instructions to perform operations. Some example logic circuits include a combination of specifically configured hardware and hardware that executes machine-readable instructions.

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) can be stored. Further, as used herein, each of the terms "tangible machine-readable medium," "non-transitory machine-readable medium" and "machine-readable storage device" is expressly defined to exclude propagating signals. That is, as used in any claim of this patent, a "tangible machine-readable medium" cannot be read to be implemented by a propagating signal. Further, as used in any claim of this patent, a "non-transitory machine-readable medium" cannot be read to be implemented by a propagating signal. Further, as used in any claim of this patent, a "machine-readable storage device" cannot be read to be implemented by a propagating signal.

Additionally, as used herein, each of the terms "tangible machine-readable medium," "non-transitory machine-readable medium" and "machine-readable storage device" is expressly defined as a storage medium on which machine-readable instructions are stored for any suitable duration of time (e.g., permanently, for an extended period of time (e.g., while a program associated with the machine-readable instructions is executing), and/or a short period of time (e.g., while the machine-readable instructions are cached and/or during a buffering process)).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system, comprising:
a handheld barcode reader, the handheld barcode reader having an identifier unique to the handheld barcode reader; and
an augmented reality adapter having:
a camera having a field of view (FOV);
a presentation generator configured to provide an augmented reality display based on first data captured by the handheld barcode reader, wherein the position of the augmented reality display on the presentation generator is based on a location of the identifier within the FOV;
a memory configured to store non-transitory computer executable instructions; and
a processor configured to interface with the presentation generator, the camera, and the memory, and configured to execute the non-transitory computer executable instructions to cause the processor to:
analyze images captured by the camera to identify the identifier of the handheld barcode reader;
receive second data, based on first data captured by the handheld barcode reader associated with the identifier; and
cause the presentation generator to display, via the augmented reality display, third data, based on the second data, wherein the presentation generator is configured to display the third data at a display time that is substantially simultaneous to a capture time at which the first data is captured by the handheld barcode reader.

2. The system of claim 1, wherein the handheld barcode reader and the augmented reality adapter communicate via a short range wireless connection.

3. The system of claim 1, wherein the non-transitory computer executable instructions further cause the processor to:
analyze the images captured by the camera to detect a movement of the identifier;
determine that the movement of the identifier indicates a user selection; and
modify the augmented reality display based on the user selection.

4. The system of claim 3, wherein detecting the movement of the identifier includes detecting a direction of the movement of the identifier, and wherein the user selection is determined based on the direction of the movement of the identifier.

5. The system of claim 1, wherein the non-transitory computer executable instructions further cause the processor to:
analyze the images captured by the camera to detect a light emitted by the handheld barcode reader;
determine that the light emitted by the handheld barcode reader indicates a user selection; and
modify the augmented reality display based on the user selection.

6. The system of claim 5, wherein determining that the light emitted by the handheld barcode reader indicates a user selection includes analyzing the images captured by the camera to determine that the light emitted by the handheld barcode reader does not impinge on a barcode.

7. The system of claim 5, wherein detecting the light emitted by the handheld barcode reader includes detecting a location of the light relative to the location of the identifier, and wherein the user selection is determined based on the location of the light relative to the location of the identifier.

8. The system of claim 1, wherein the non-transitory computer executable instructions further cause the processor to:
analyze the images captured by the camera to identify a first target associated with the handheld barcode reader and a second target associated with the handheld barcode reader;
analyze the images captured by the camera to determine that one of the first target or the second target is obstructed within the FOV;
determine that the obstructed first target or second target indicates a user selection; and
modify the augmented reality display based on the user selection.

9. The system of claim 1, wherein the first target is a first LED of the handheld barcode reader and the second target is a second LED of the handheld barcode reader.

10. An augmented reality adapter comprising:
a camera having a field of view (FOV);
a presentation generator configured to provide an augmented reality display based on first data captured by a handheld barcode reader having a unique identifier, wherein the position of the augmented reality display on the presentation generator is based on a location of the identifier within the FOV;
a memory configured to store non-transitory computer executable instructions; and
a processor configured to interface with the presentation generator, the camera, and the memory, and configured to execute the non-transitory computer executable instructions to cause the processor to:
analyze images captured by the camera to identify the identifier of the handheld barcode reader;
receive second data, based on first data captured by the handheld barcode reader associated with the identifier; and
cause the presentation generator to display, via the augmented reality display, third data, based on the second data, wherein the presentation generator is configured to display the third data at a display time that is substantially simultaneous to a capture time at which the first data is captured by the handheld barcode reader.

11. The augmented reality adapter of claim 10, wherein the non-transitory computer executable instructions further cause the processor to:
analyze the images captured by the camera to detect a movement of the identifier;
determine that the movement of the identifier indicates a user selection; and modify the augmented reality display based on the user selection.

12. A computer-implemented method, comprising:
analyzing, by a processor, images captured by a camera of an augmented reality adapter, the camera having a field of view (FOV), to identify an identifier unique to a handheld barcode reader and a location of the identifier within the FOV;
receiving, by the processor, second data, based on first data captured by the handheld barcode reader associated with the identifier; and
causing, by the processor, a presentation generator of the augmented reality adapter to display, via an augmented reality display, third data, based on the second data,
wherein the position of the augmented reality display on the presentation generator is based on the location of the identifier within the FOV, and
wherein the presentation generator is configured to display the third data at a display time that is substantially simultaneous to a capture time at which the first data is captured by the handheld barcode reader.

13. The computer-implemented method of claim 12, wherein the handheld barcode reader and the augmented reality adapter communicate via a short range wireless connection.

14. The computer-implemented method of claim 12, further comprising:
analyzing, by the processor, the images captured by the camera to detect a movement of the identifier;
determining, by the processor, that the movement of the identifier indicates a user selection; and
modifying, by the processor, the augmented reality display based on the user selection.

15. The computer-implemented method of claim 14, wherein detecting the movement of the identifier includes detecting a direction of the movement of the identifier, and wherein the user selection is determined based on the direction of the movement of the identifier.

16. The computer-implemented method of claim 12, further comprising:
analyzing, by the processor, the images captured by the camera to detect a light emitted by the handheld barcode reader;
determining, by the processor, that the light emitted by the handheld barcode reader indicates a user selection; and
modifying, by the processor, the augmented reality display based on the user selection.

17. The computer-implemented method of claim 16, wherein determining that the light emitted by the handheld barcode reader indicates a user selection includes analyzing the images captured by the camera to determine that the light emitted by the handheld barcode reader does not impinge on a barcode.

18. The computer-implemented method of claim 16, wherein detecting the light emitted by the handheld barcode reader includes detecting a location of the light relative to the location of the identifier, and wherein the user selection is determined based on the location of the light relative to the location of the identifier.

19. The computer-implemented method of claim 12, further comprising:
analyzing, by the processor, the images captured by the camera to identify a first target associated with the handheld barcode reader and a second target associated with the handheld barcode reader;
analyzing, by the processor, the images captured by the camera to determine that one of the first target or the second target is obstructed within the FOV;
determining, by the processor, that the obstructed first target or second target indicates a user selection; and
modifying, by the processor, the augmented reality display based on the user selection.

20. The computer-implemented method of claim 19, wherein the first target is a first LED of the handheld barcode reader and the second target is a second LED of the handheld barcode reader.

* * * * *